W. MULLALLY.

Apparatus for Extinguishing Fires.

No. 6,173. Reissued Dec. 15, 1874.

WITNESSES:

A. P. Robertson.

Solon C. Kemon

INVENTOR:

E. J. Mitchell assignee of Wm. Mullally

BY Allen & Co

ATTORNEYS.

THE GRAPHIC CO. PHOTO-LITH. 39 & 41 PARK PLACE, N.Y.

UNITED STATES PATENT OFFICE.

WILLIAM MULLALLY, OF BOSTON, MASS., ASSIGNOR, BY MESNE ASSIGNMENTS, TO EDWARD J. MITCHELL, OF JEFFERSONVILLE, INDIANA.

IMPROVEMENT IN APPARATUS FOR EXTINGUISHING FIRES.

Specification forming part of Letters Patent No. 78,636, dated June 2, 1868; reissue No. 6,173, dated December 15, 1874; application filed November 7, 1874.

*To all whom it may concern:*

Be it known that WILLIAM MULLALLY, of Boston, in the county of Suffolk and State of Massachusetts, did invent a new and useful Improvement in Apparatus for Extinguishing Fires; and I do hereby declare the following to be a full, clear, and exact description of the same, reference being had to the accompanying drawing, making a part of this specification, in which—

Figure 1:
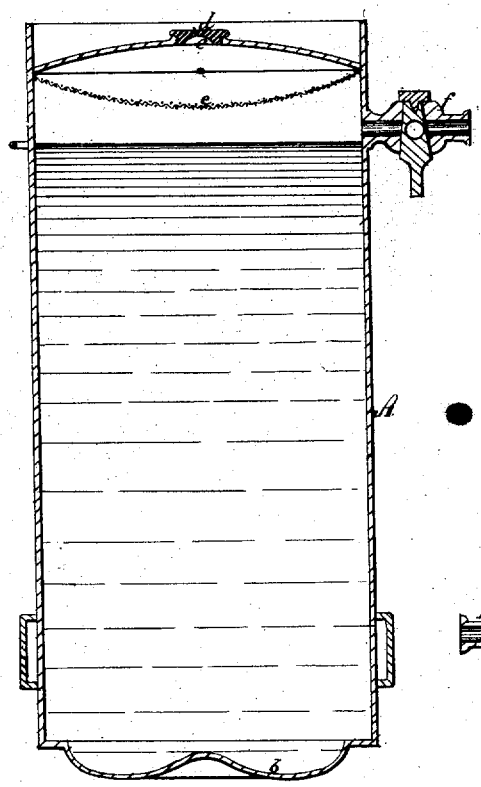
Figure 2:
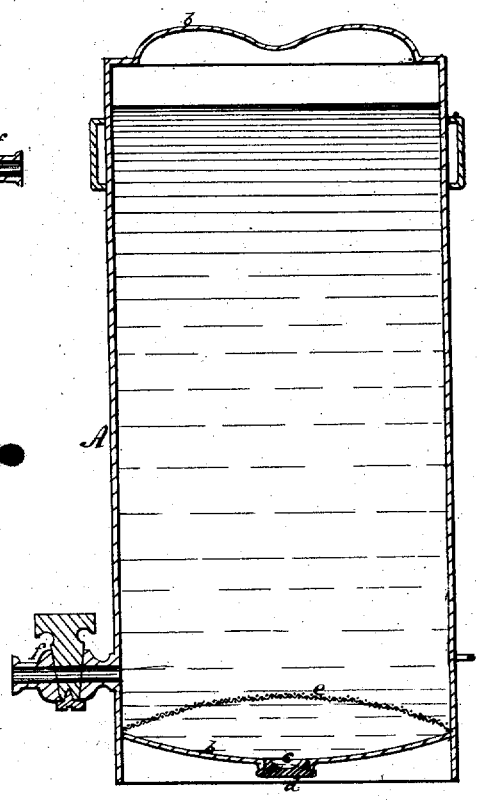

Figures 1 and 2 are vertical sections of the apparatus.

This invention contemplates the employment of a cylindrical or other proper shaped vessel, capable of withstanding considerable internal pressure and with both ends tightly closed, with the exception of a filling-orifice and screw plug or valve inserted in one of them, the vessel being provided with an escape-cock near to one end thereof for the discharge of its contents, and being, furthermore, provided with a foraminous or perforated shelf or partition, disposed within it in such a manner as to leave a small chamber between it and the screw-plug before mentioned, such chamber being for reception of one portion of the chemical ingredients used in charging the water, in manner as hereinafter described.

Both ends of the cylinder A are closed by heads *b b*, in one of which a filling-orifice, *c*, is made, such orifice being filled by a screw-plug, *d*. Within the interior of the reservoir A, and near the orifice *c*, is inserted a foraminous or wire-gauze partition or shelf, *e*, so disposed therein as to leave a small inclosure between it and the end of the reservoir sufficient for the reception of a small quantity of bicarbonate of soda or tartaric acid or other ingredients, the interstices of the shelf *e* being of sufficient fineness to prevent such acid powder from escaping through them under ordinary circumstances. An escape-cock, *f*, is applied in proximity to the foraminous shelf *e*.

To adjust it in readiness for use, it is to be placed in the position shown in Fig. 1 of the drawing, or with its filling-orifice uppermost. Water is then poured into the vessel A until it is nearly filled, (care being taken, however, that the water shall not reach the foraminous shelf,) and a quantity of bicarbonate of soda or tartaric acid introduced and thoroughly incorporated with the water. The apparatus is now ready for use, with the exception of the opposite acid or ingredient, which is, if the water is charged with bicarbonate of soda, tartaric acid or its equivalent. This second ingredient is to be placed within the vessel A and upon the foraminous shelf *e*.

In case of fire the apparatus is to be immediately inverted and maintained in the position shown in Fig. 2 of the drawing. This has the effect of mixing the dry acid contained on the foraminous shelf with the water already charged with the opposite acid or ingredient, the water being thus charged with carbonic-acid gas. Upon opening the cock *f* the pressure of the gas within the vessel A has the effect of discharging with considerable force the combined water and gas upon the fire through a suitable discharge tube or nozzle.

The advantages of this construction of a portable fire-extinguisher are several. First, as its filling-orifice is at bottom when charged with gas, its upper part, or that taking the strain, may be made very strong, so as to prevent bursting, opening of joints, or the escape of the carbonic-acid gas; secondly, as a final charging of the apparatus is attained by simply inverting it, all contrivances to effect this purpose are dispensed with, thus preventing a leakage or escape of gas from the apparatus, and enabling the charging of it to be done instantaneously and with little or no trouble. Another advantage, and by no means an unimportant one, is the great simplicity of this machine, and the low cost at which the apparatus may be manufactured and sold.

It is known that it is not new to provide a horizontal trunnioned cylinder with a shelf upon which one of the chemical ingredients is placed and precipitated into the other, for the purpose of mixing the two by a partial revolution of the cylinder; but in such extinguisher the gas, and not the liquid, is used as the extinguishing element. I therefore disclaim such invention as that of WM. MULLALLY; but, having described said MULLALLY'S invention,

What I claim as new therein is—

1. A chemical fire-extinguisher in which one of the chemicals is suspended above the other, and the two mixed by the inversion of the extinguisher, substantially as described.

2. The combination, in a chemical fire-extinguisher, of the following elements, to wit, a reservoir, the main body of which is adapted to receive one of the chemical ingredients and a supply of water, a receptacle for the other chemical ingredient placed above the same, and a supply-orifice and discharge-cock arranged respectively in and near the end of the reservoir containing the last-mentioned chamber, whereby, when the extinguisher is inverted, the chemicals are mixed and the openings in the same are water-sealed to prevent the escape of gas, substantially as described.

EDWARD J. MITCHELL,
*Assignee.*

Witnesses:
S. B. DIFFENDERFER,
A. H. PATTERSON.